April 18, 1961 P. E. YOST Re. 24,966

BALLOON SYSTEM

Original Filed Dec. 17, 1956 2 Sheets-Sheet 1

INVENTOR.
Paul E. Yost
BY Sam J. Slotky
ATTORNEY

BALLOON SYSTEM
Original Filed Dec. 17, 1956 2 Sheets-Sheet 2
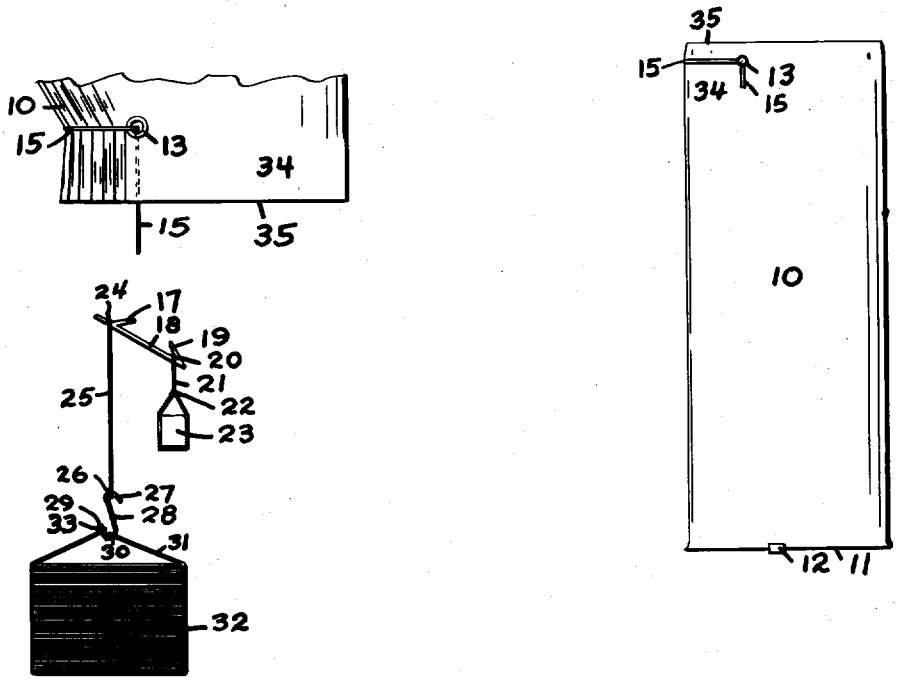
Fig. 7
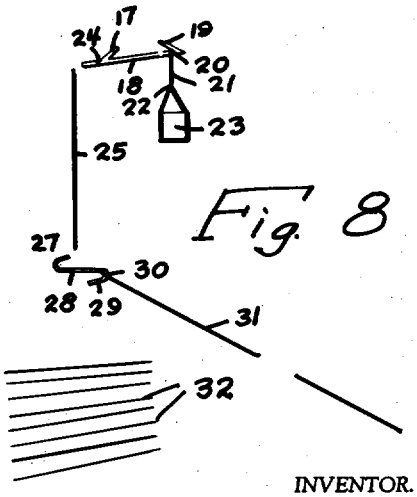
Fig. 8
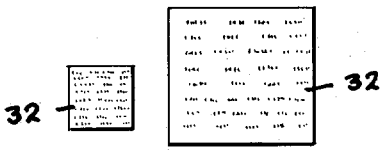
INVENTOR.
Paul E. Yost
BY
Sam J. Slotky
ATTORNEY United States Patent Office Re. 24,966
Reissued Apr. 18, 1961

24,966

BALLOON SYSTEM

Paul E. Yost, Sioux Falls, S. Dak., assignor to Raven Industries, Inc., Sioux Falls, S. Dak., a corporation of South Dakota Original No. 2,932,469, dated Apr. 12, 1960, Ser. No. 628,914, Dec. 17, 1956. Application for reissue Sept. 19, 1960, Ser. No. 57,090

8 Claims. (Cl. 244—24)

Matter enclosed in heavy brackets [ ] appears in the original patent but forms no part of this reissue specification; matter printed in italics indicates the additions made by reissue.

My invention relates to a balloon system.

An object of my invention is to provide an improved balloon system pertaining particularly to that type of balloon using thin plastic film material, and that type of balloon which is adapted to carry propaganda, or scientific instruments, etc., to desired positions or elevations.

A further object of my invention is to provide a balloon of this type with attendant means for valving the gas in the balloon through a certain flap or channel arrangement.

A further object of my invention is to provide a means attached to the balloon for supporting the load to be released, and whereby release of the load at the predetermined interval will cause the lower end of the balloon to open.

A further object of my invention is to provide means for evacuating the lifting gas after the load has been released, and to further provide a special type of device for releasing the load.

A still further object of my invention is to provide a means for supporting the load by means of an arrangement which cooperates to also release the gas without the necessity of using shrouds or other attaching means.

Figure 1:
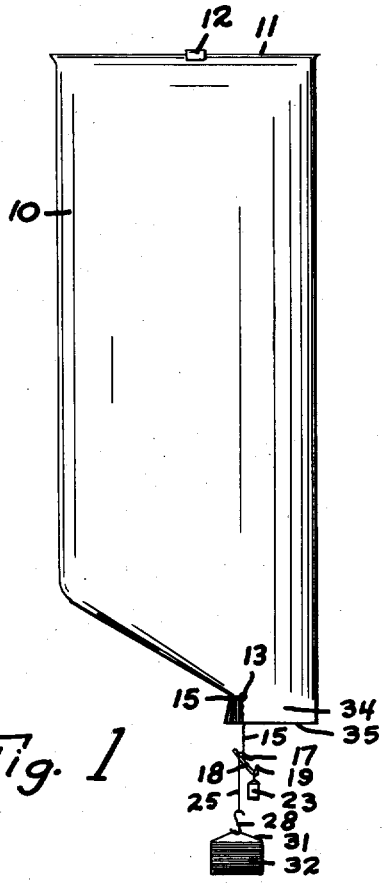
Figure 2:
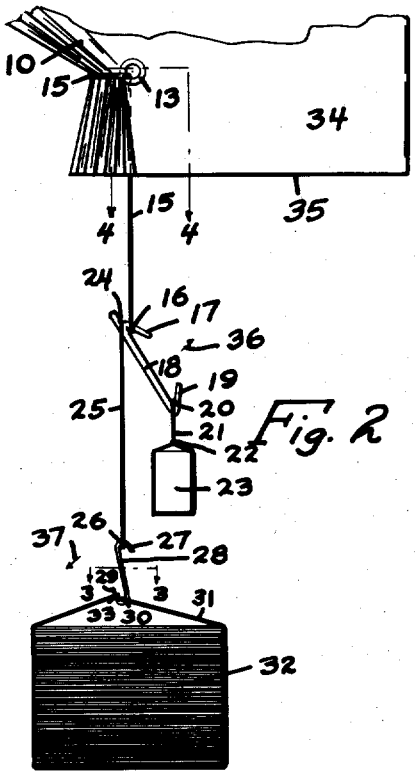
Figure 3:
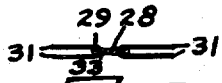
Figure 4:
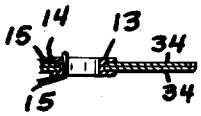
Figure 5:
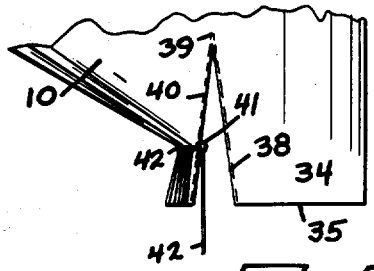
Figure 6:
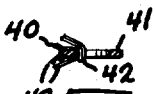

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a forward elevation of the balloon in its lifting or fully inflated condition, Figure 2 is a detail of the releasing mechanism, Figure 3 is an enlarged sectional view taken along the lines 3—3 of Figure 2, Figure 4 is an enlarged sectional view taken along the lines 4—4 of Figure 2, Figure 5 is a modification, Figure 6 is an enlarged sectional detail of a portion of Figure 5, Figure 7 is an enlarged view showing the disposition of certain of the parts when the balloon loop is released, and just before the load is released, and Figure 8 is a further view showing the disposition of the same parts as the load is released, and showing the inverted balloon at a distance.

My invention relates generally to balloons principally using hydrogen gas, it being understood, however, that many of the principles involved can apply to any type of balloon. In many cases, in certain countries where propaganda leaflets are to be dropped, helium is not available and hydrogen must be used, and after the propaganda has been released, such balloons through gradual dissipation of the hydrogen will settle to the earth, and, however, will still contain a certain amount of the hydrogen therein which is relatively dangerous if brought near a flame and the like, one of the objectives of my invention being to insure that all of the hydrogen is completely evacuated. My invention further contemplates the provision of the various other objects mentioned hereinabove, and especially the simultaneous opening of the balloon and releasing of the load.

I have used the character 10 to designate the balloon generally, the balloon being made of very thin plastic material, the balloon being sealed along the top edge 11, and attached to the top edge 11 I place a small weight 12.

Secured to both sides of the balloon is a small ring or grommet 13 (see Figure 4), it being noted that this grommet will securely tie the two sides of the balloon together at this point. Secured to the grommet 13 at 14 is a double cord 15 which passes about a lower portion of the balloon, this cord 15 thence passing through the ring or grommet 13 and thence passing downwardly in its looped formation where it is received at 16 under the small lever portion 17 which is a continuation of the arm 18 (see Figure 2), the arm 18 extending into the upwardly extending portion 19, and passing between the portions 18 and 19 at 20 is a looped cord 21 which is tied at 22 to the counter-weight 23. The counter-weight 23 can be made of any suitable material such as Dry Ice, or any other material which will gradually evaporate or become dissipated and correspondingly will lose weight.

The arm 18 includes a small notch at 24 over which passes a further looped cord 25 which is secured at 26 beneath the hook portion 27 of the member 28 which extends into the further hook portion 29, and attached about the portion 28 at 30 is a double looped cord 31 which passes about the load 32, the end of the looped cord thence being slipped over the end of the hook 29 at 33. The load 32 in the present instance is shown as a package of leaflets which are to be dropped over a certain area, however, it should be specifically understood that this load could be in any other form, particularly parachutes carrying scientific instruments, etc.

When the balloon is started on its flight, it is arranged substantially as shown in Figure 1, the noose portion of the cord 15 of course being longer than that shown, and the hydrogen gas can be introduced between the pair of flaps 34 which are at the lower right-hand corner of the balloon, these flaps at the portion 35 not being sealed.

The load and releasing mechanism is allowed to drop to the position shown and in the manner shown, whereby the noose 15 will draw up the folds of the material to the positions shown in Figures 1 and 2, thereby fairly tightly closing the balloon at this point, however, the hydrogen will not escape due to the fact that the greater outside pressure will prevent the same. As the balloon rises, the flaps 34 will provide a valve which will allow the excess hydrogen pressure to escape along the line 35, but will not allow the entrance of air since the flaps will close due to the outside pressure, and as a result an efficient valve is provided by means of the flaps 34. This valving will continue until the system comes into equilibrium and the balloon system will remain floating until the equilibrium is destroyed, which will occur by the loss of weight on the counterweight 23 which provides a timing function which may be set to keep the system afloat until it has had time to move with the wind over a pre-selected area.

*In other words, the invention provides a balloon envelope 10 which is of a generally tubular shape with the upper end or top edge 11 being closed. The material at the lower end of the balloon envelope forms an open end and a portion of the lower end of the balloon envelope is gathered together for only a portion of the distance across the lower open end. A band or cord 15 is secured around the gathered material clamping it to*

*gether and holding it preventing leakage through the gathered material, of gas out of the envelope or of air into the envelope. The layers of plastic or the flaps 34 at the side of the gathered portion are in freely engaging confronting relationship so that the pressure differential between the atmospheric air and gas at the bottom end of the balloon envelope will normally hold the layers together. When the pressure differential changes so that the pressure inside of the balloon at the lower end of the envelope becomes greater than the atmospheric pressure, the layers will separate to permit the escape of gas. The layers thus act as an automatic opening gas valve permitting the escape of gas and preventing the entry of atmospheric air.*

When the counter-weight 23 becomes light enough through dissipation, etc. the arm 18 will rise in the direction of the arrow 36, the looped cord 25 will gradually pull downwardly at the notch 24 until the cord 25 will be released, and release of the cord at the point 26 will cause the member 28 to pivot in the direction of the arrow 37, releasing the looped cord 31 and thence releasing the leaflets or load 32. At the same time the cord 15 will be released and the noose 15 will enlarge, thereby increasing the tendency of the hydrogen to escape, and due to the fact that the load has been released, the tendency will be for the weight 12 to cause the balloon to turn completely over, whereby the hydrogen will then flow freely through the top and will drop to the earth and be harmless.

Figures 7 and 8 show the action of the various parts as stated above, the balloon 10 being necessarily shown smaller in Figure 8 since it will appear as at a distance, and part of the leaflets 32 are shown at right angles to the other leaflets due to the effect of the wind carrying the leaflets away as they are released.

Figures 5 and 6 illustrate a modification wherein the flaps 34 are bounded by a sealed border as at 38, and joining this border at 39 is a further sealed border 40, a ring 41 being secured to the sealed portion, and with a looped cord 42 (see also Figure 6) being attached about a portion of the ring 41, and thence passing around a portion of the balloon similar to the modification shown in Figure 1, the cord 42 thence passing through the ring 41 and thence downwardly to the same release mechanism shown in Figure 2, it being also understood that other similar mechanisms could be employed. The arrangement described in Figures 5 and 6 will perform the same function, and other modifications could be employed without departing from the essential spirit of my invention incorporating the principle of the looped noose.

I further contemplate the provision of the loop structure in a conventional balloon not having the channel or flap structure 34, or in other words, a balloon in which the noose will pass around the entire bottom part thereof and which will be released when the load drops.

It will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A balloon comprising a gas inflated bag having a closed end, and an openable end, means for closing a portion of said openable end whereby the remaining portion of said openable end will provide a valve, said closing means including a flexible loop surrounding said portion to be closed, means for pulling said loop tightly including a releasable load attached at the lower terminal of said loop, a dissipating counter-weight co-acting with said releasable load to release said releasable load at a pre-determined interval, whereby said loop will be opened, a pivotal arm attached to said dissipating member, the lower terminal of said loop being attached to said pivotal arm, an attaching member attached to said pivotal arm and to said load, a releasing member normally attached to said attaching member and to said load, whereby pivoting of said arm will cause said releasing member to release said load.

2. A balloon comprising a gas inflated bag having a closed end, and an openable end, means for closing a portion of said openable end whereby the remaining portion of said openable end will provide a valve, said closing means including a flexible loop surrounding said portion to be closed, means for pulling said loop tightly including a releasable load attached at the lower terminal of said loop, a weight attached at the top of said balloon for overturning said balloon upon release of said load.

3. A balloon system comprising a gas inflated bag having one of its ends normally operable substantially throughout the length of said end, means for closing a portion of said openable end whereby the remaining portion of said openable end will provide a valve, said closing means including a flexible loop surrounding said portion to be closed, means for pulling said loop tightly including a releasable load attached at the lower terminal of said loop a dissipating counterweight co-acting with said loop and said releasable load to release said releasable load and said loop at a pre-determined interval.

4. A balloon system comprising a gas inflated bag having one of its ends normally openable substantially throughout the length of said end, means for closing a portion of said openable end whereby the remaining portion of said openable end will provide a valve, said closing means including a flexible loop surrounding said portion to be closed, means for pulling said loop tightly including a releasable load attached at the lower terminal of said loop, a dissipating counterweight co-acting with said loop and said releasable load to release said releasable load and said loop at a pre-determined interval, including a pivotal arm attached at one end to said dissipating counterweight, the lower terminal of said loop being attached to the other end of said pivotal arm, an attaching member attached to said pivotal arm and to said load, a releasing member normally attached to said attaching member and to said load, pivoting of said arm causing said releasing member to release said load.

5. A balloon system comprising a gas inflated bag having one of its ends normally openable substantially throughout the length of said end, means for closing a portion of said openable end whereby the remaining portion of said openable end will provide a valve, a releasable load attached to said balloon, a weight attached at the top of said balloon for over-turning said balloon when said releasable load is released.

*6. A balloon comprising a generally tubular shaped balloon envelope to be inflated with a lifting gas for supporting a pay load being formed of a thin plastic material, means closing the upper end of the balloon envelope, a portion of the lower end of the envelope being gathered together for only a portion of the distance across the lower open end, and means holding the material of said gathered portion together preventing the leakage of gas therethrough, the layers of plastic material at the side of said gathered portion being in freely engaging confronting relationship so that atmospheric air pressure can hold said layers together preventing the entry of air, and gas pressure within the balloon can force said layers apart to permit the escape of gas so that said layers of material act as a gas valve.*

*7. A balloon comprising a generally tubular shaped balloon envelope to the inflated with a lifting gas for supporting a pay load being formed of a thin plastic material, means closing the upper end of the balloon envelope, a portion of the lower end of the envelope being gathered together for only a portion of the distance*

*across the lower open end, and a band secured around the gathered material holding it together and preventing leakage of gas therethrough, the layers of plastic material at the side of said gathered portion being in freely engaging confronting relationship so that atmospheric air pressure can hold said layers together preventing the entry of air, and gas pressure within the balloon can force said layers apart to permit the escape of gas so that said layers of material act as a gas valve.*

*8. A balloon comprising a generally tubular shaped balloon envelope to be inflated with a lifting gas for supporting a pay load being formed of a thin plastic material, means closing the upper end of the balloon envelope, a portion of the lower end of the envelope being gathered together for only a portion of the distance across the lower open end, means clamping the material of said gathered portion together and holding it preventing the leakage of gas therethrough, the layers of*

*plastic material at the side of said gathered portion being in freely engaging confronting relationship so that atmospheric air pressure can hold said layers together preventing the entry of atmospheric air, and gas pressure within the balloon can force said layers apart to permit the escape of gas so that said layers of material act as a gas valve, and means for releasing said clamping means releasing said gathered material so that the material can spread and open the balloon envelope to the atmosphere for terminating the flight of the balloon.*

References Cited in the file of this patent
or the original patent

UNITED STATES PATENTS

| | | |
|---|---|---|
| 2,758,803 | Winzen | Aug. 14, 1956 |
| 2,793,824 | D'ooge | May 28, 1957 |